US007460590B2

(12) United States Patent  
Lee

(10) Patent No.: US 7,460,590 B2
(45) Date of Patent: Dec. 2, 2008

(54) HANDHELD COMMUNICATION TESTER AND METHOD FOR TESTING DIRECT SERIAL COMMUNICATION CAPABILITY OF AN INTELLIGENT ELECTRONIC DEVICE IN A POWER SYSTEM

(75) Inventor: Tony J. Lee, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 581 days.

(21) Appl. No.: 11/226,824

(22) Filed: Sep. 14, 2005

(65) Prior Publication Data

US 2007/0058320 A1 Mar. 15, 2007

(51) Int. Cl.
*H04B 3/46* (2006.01)
(52) U.S. Cl. ...................................... 375/224
(58) Field of Classification Search ................. 375/224, 375/225, 228, 260; 73/855; 455/575.1, 90.3, 455/128, 347
See application file for complete search history.

(56) References Cited

U.S. PATENT DOCUMENTS

| | | | |
|---|---|---|---|
| 4,551,718 A | 11/1985 | Cookson | |
| 4,620,257 A | 10/1986 | Sano | |
| 4,899,383 A | 2/1990 | Einolf, Jr. | |
| 4,935,837 A | 6/1990 | Sun | |
| 4,972,290 A | 11/1990 | Sun | |
| 5,069,521 A | 12/1991 | Hardwick | |
| 5,267,231 A | 11/1993 | Dzieduszko | |
| 5,371,736 A | 12/1994 | Evan | |
| 5,680,324 A * | 10/1997 | Schweitzer et al. | ......... 370/241 |
| 5,793,750 A | 8/1998 | Schweitzer, III | |
| 5,838,525 A | 11/1998 | Ward | |
| 5,982,595 A | 11/1999 | Pozzuoli | |
| 6,005,759 A | 12/1999 | Hart | |
| 6,160,806 A | 12/2000 | Cantwell | |
| 6,469,629 B1 | 10/2002 | Campbell | |
| 6,633,998 B1 * | 10/2003 | Lau | .............................. 714/22 |
| 6,795,789 B2 * | 9/2004 | Vandiver | ..................... 702/122 |
| 2002/0006199 A1 | 1/2002 | Sako | |
| 2002/0173927 A1 | 11/2002 | Vandiver | |
| 2005/0276133 A1 * | 12/2005 | Harding et al. | ............. 365/203 |

(Continued)

OTHER PUBLICATIONS

Translation of Siemen letter dated Jun. 14, 2004 to EPO Munich in opposition to EP 0810714.

(Continued)

*Primary Examiner*—Sam K Ahn
(74) *Attorney, Agent, or Firm*—Eugene M. Cummings, P.C.

(57) ABSTRACT

Provided is a handheld communication tester and method for testing direct serial communication capability of an IED. The first IED includes an equal plurality of transmit bit channels and receive bit channels. The handheld communication tester includes a housing sized for single-hand portability, a connector disposed in a wall of the housing and adapted for connection to the IED or a serial communication link to the IED, and a microcontroller disposed inside of the housing and operatively coupled to the connector. The microcontroller is programmed to detect synchronization with the IED, to automatically detect and store a Baud rate of the IED, automatically detect and store a transmit identification of the IED, and automatically detect and store a receive identification of the IED. The transmit identification is used to encode transmissions from the IED, and the receive identification is used to encode transmissions received by the IED.

34 Claims, 7 Drawing Sheets

U.S. PATENT DOCUMENTS

2005/0280965 A1 12/2005 Lee
2006/0095507 A1 5/2006 Watson

OTHER PUBLICATIONS

7SD512 V3 Digitaler Stromvergleichsschutz für Leitungen, Geratehandbuch der Siemens AG, 1995 Order No. C53000-G1100-C105-1.
European Patent Application No. EP 0 554 553 A2.
A Numerical Current Comparison Protection With Digital Measured Value Transmission Over Fibre Optic Cable, Koch et al., Southern African Conference on Power System Protection, Sep. 1991.
A New Approach to Digital Current Differential Protection for Low and Medium Voltage Feeder Circuits Using a Digital Voice-Frequency Grade Communications Channel, Redfern et al., IEEE Transactions on Power Delivery 9 (Jul. 1994) No. 3, New York, U.S.
European Patent Application No. EP 0 175 120 B2.
U.S. Appl. No. 08/546,477 dated 1995.
Withdrawal application for U.S. Appl. No. 08/546,477 dated 1995.
Confirmation from a customer (Eskom) of Siemens AG from South Africa.
Delivery note for current comparison protection devices 7SD512 dated Feb. 1996.
Statutory Declaration by Mr. Staasmeier.
Acceptance roport on 7SD512 apparatus (take-over report dated Nov. 27, 1996).
Schweitzer Engineering Laboratories, Inc., "SEL-2505 Remote I/O Module," 2005 SEL Product Catalog, pp. 201-204.

* cited by examiner

HANDHELD COMMUNICATION TESTER AND METHOD FOR TESTING DIRECT SERIAL COMMUNICATION CAPABILITY OF AN INTELLIGENT ELECTRONIC DEVICE IN A POWER SYSTEM

CROSS-REFERENCE TO RELATED APPLICATIONS

This application is related to the following commonly-owned co-pending patent application "Relay-to-Relay Direct Communication System in an Electrical Power System," Ser. No. 09/900,098.

BACKGROUND OF THE INVENTION

The present invention generally relates to testing of intelligent electronic devices of a power system, and more specifically, to a handheld communication tester and method for testing direct serial communication capability of an intelligent electronic device in a power system.

Electric utility systems or power systems are designed to generate, transmit and distribute electrical energy to loads. In order to accomplish this, power systems generally include a variety of power system elements such as electrical generators, electrical motors, power transformers, power transmission lines, buses and capacitors, to name a few. As a result, power systems also include a variety of intelligent electronic devices (IEDs) for protecting, monitoring, controlling, metering and/or automating power system elements. For example, one type of IED, a microprocessor- or FPGA-based modern protective relay, is configured to protect the power system elements from abnormal conditions such as electrical short circuits, overloads, frequency excursions, voltage fluctuations, and the like. Another type of IED, a microprocessor- or FPGA-based meter is used for tracking system power delivery and consumption.

In addition to power system elements and IEDs, power systems also include communication schemes that enable IED-to-IED communication as well as IED-to-computer communication, and the like. For example, U.S. Pat. No. 5,793,750, entitled "System of Communicating Output Function Status Indications Between Two or More Power System Protective Relays," discloses a communication system where each of two microprocessor- or FPGA-based modern protective relays included both transmit and receive modules adapted to enable direct transmission of output status bits to the other protective relay. Such output status bits result from relay processing of measured voltages and/or currents on, for example, a monitored transmission line. As a result, output status bits transmitted from a first protective relay are "mirrored" in the second protective relay and then used by the second protective relay to make operational decisions. Thus, unlike slower prior transmission methods that required the use of separate communication modules as intermediaries, the communication system of the '750 patent facilitates speedy transmission and therefore quick identification of the existence and location of a fault on the transmission line monitored by the two protective relays.

An improvement to the '750 patent, U.S. Patent, Publication No. 2003/0007514, entitled "Relay-to-Relay Direct Communication System in an Electric Power System," the contents of which are hereby incorporated by reference, discloses a communication system between at least two protective relays that enables direct transmission of not only output status bits, but also digitized analog values (e.g., metering information, breaker wear information, security enhancement information) and digitized virtual terminal data (i.e., data transmitted via a communication link established between a user located at a port of a first relay and a second relay). Accordingly, communication link usage between the two protective relays is optimized because otherwise vacant channels can be used to transmit synchronized successive data messages that include the output status bits, the digitized analog values and virtual terminal data. Further, synchronized transmission of successive data messages facilitates rapid transmission of multi-bit digitized analog values and virtual terminal data between a first and a second protective relay.

In both the '750 patent and the 2003/0007514 patent application publication, the first and second protective relays or other IEDs are operatively connected to each other via a serial communication link to enable the bi-directional "mirrored bits communication". The serial communication link may be configured as an RF link, a microwave link, an audio link, a fiber optic link, or another other type of suitable link adapted to carry serialized data.

When installed in a power system, operational testing of the coupled IEDs (e.g., protective relays) and their associated serial communication link is conducted to ensure, inter alia, mirrored bit communication capability. A Mirrored Bits® Interface device is typically used to test mirrored bit communication capability for both the transmit and the receive function of an IED. The Mirrored Bits® Interface device includes a number of operator actuated pushbuttons and two sets of an equal number (e.g., eight) of light emitting diodes (LEDs) in order to enable the testing.

While effective for testing the mirrored bit communication capability of an IED, the size of the Mirrored Bits® Interface device makes it cumbersome in some applications such as field testing. In addition, the user must hand-enter the Baud rate, the receive identification number (RX ID) and the transmit identification number (TX ID) of the tested IED into the Mirrored Bits® Interface device prior to testing mirrored bit communication capability of the IED; a time-consuming and error prone process.

SUMMARY OF THE INVENTION

In accordance with an embodiment of the invention, provided is a handheld communication tester for testing direct serial communication capability of a first intelligent electronic device (IED) in a power system. The first IED includes a plurality of transmit bit channels and a plurality of receive bit channels. The handheld communication tester includes a housing including a connector adapted for connection to the first IED, and a microcontroller disposed inside of the housing and operatively coupled to the connector and a power source. The microcontroller includes a microprocessor and a memory operatively coupled to the microprocessor. The microcontroller is programmed to detect connection with the first IED, to automatically detect and store a Baud rate of the first IED, and to automatically detect and store at least one identification of the first IED. The at least one identification of the first IED includes a transmit identification of the first IED and/or a receive identification of the first IED. The transmit identification of the first IED is used to encode transmissions from the first IED, and the receive identification of the first IED is used to decode transmissions received by the first IED.

In accordance with another embodiment of the invention, provided is a handheld communication tester for testing direct serial communication capability of a first intelligent electronic device (IED) in a power system. The first IED includes an equal plurality of transmit bit channels and receive bit channels. The handheld communication tester includes a housing sized for single-hand portability, a connector disposed in a wall of the housing and adapted for connection to the first IED and adapted for connection to a serial communication link to the first IED, and a microcontroller disposed inside of the housing and operatively coupled to the connector, where the microcontroller includes a microprocessor and a memory operatively coupled to the microprocessor. The microcontroller is programmed to detect synchronization with the first IED where synchronization indicates a successful operative connection to the first IED via the connector. The microcontroller is further programmed to automatically detect and store a Baud rate of the first IED, automatically detect and store a transmit identification of the first IED, and automatically detect and store a receive identification of the first IED. The transmit identification is used to encode transmissions from the first IED, and the receive identification is used to encode transmissions received by the first IED during normal operation.

In accordance with a further embodiment of the invention, provided is a method for testing direct serial communication capability of a first intelligent electronic device (IED) in a power system, where the first IED includes a plurality of transmit bit channels and a plurality of receive bit channels. The method includes providing a handheld communication tester. The handheld communication tester includes a housing, a connector adapted for connection to the first IED, and a microcontroller disposed inside of the housing and operatively coupled to the connector and a power source. The handheld communication tester sized for single-hand portability. The method further includes detecting connection with the first IED, automatically detecting and storing a Baud rate of the first IED, and automatically detecting and storing at least one identification of the first IED.

It should be understood that the present invention includes a number of different aspects or features which may have utility alone and/or in combination with other aspects or features. Accordingly, this summary is not exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

Figure 1:
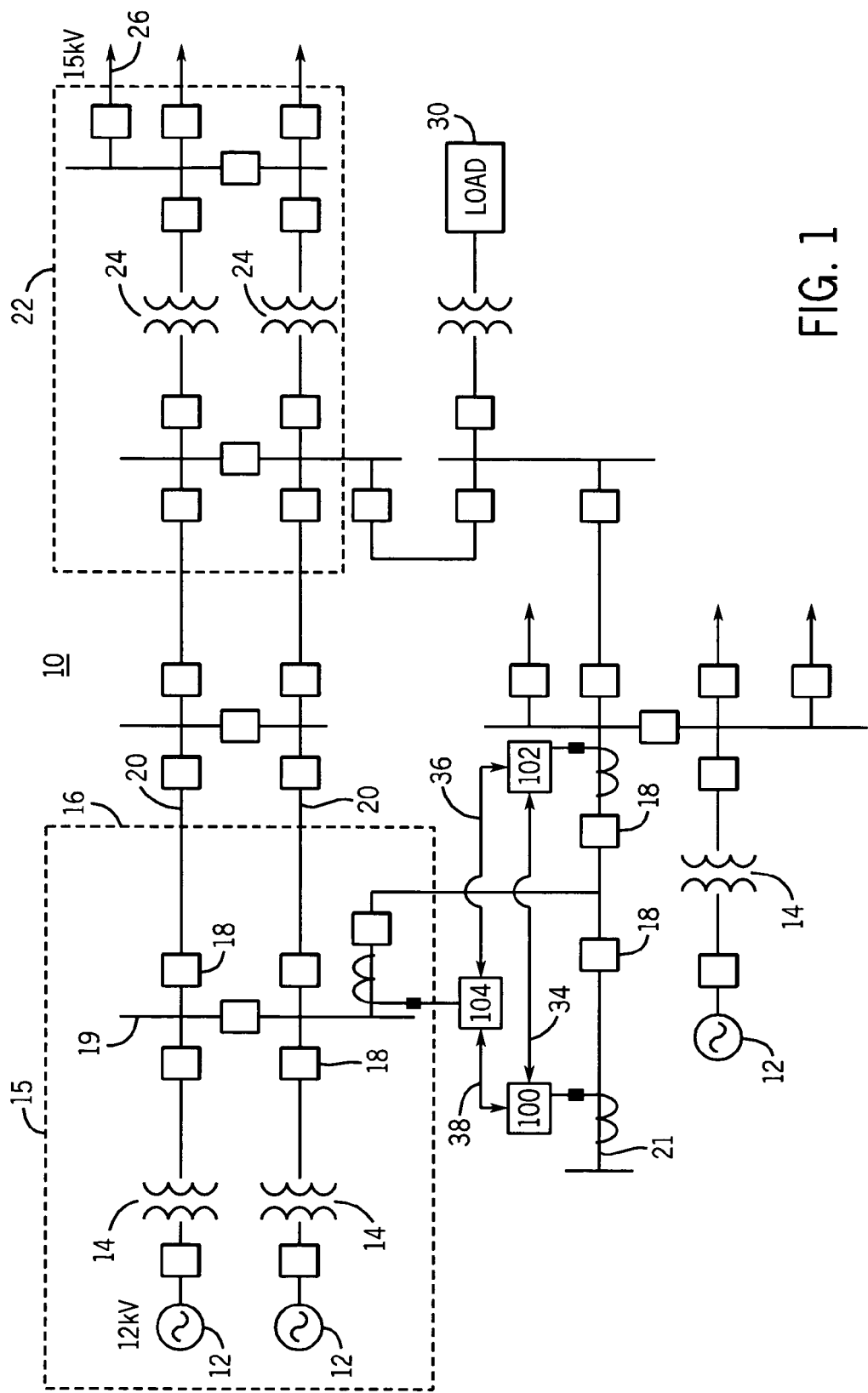
FIG. 1 is a single line schematic diagram of a power system that may be utilized in a typical wide area.

FIG. 1 is a single line schematic diagram of a power system 10, including associated intelligent electronic devices (IEDs) such as protective relays that may be utilized in a typical wide area. As illustrated in FIG. 1, the power system 10 includes, among other things, three generators 12 configured to generate three-phase sinusoidal waveforms, for example, three-phase 12 kV sinusoidal waveforms, three step-up transformers 14 configured to increase the 12 kV sinusoidal waveforms to a higher voltage such as 138 kV and a number of circuit breakers 18. The step-up transformers 14 operate to provide the higher voltage sinusoidal waveforms to a number of long distance transmission lines such as the sub-transmission lines 20. In an embodiment, a first substation 16 may be defined to include the generators 12, the step-up transformers 14, and associated circuit breakers 18, all interconnected via a first bus 19. At the end of the long distance sub-transmission lines 20, a second substation 22 includes step-down transformers 24 to transform the higher voltage sinusoidal waveforms to lower voltage sinusoidal waveforms (e.g., 15 kV) suitable for distribution via a distribution line to various end users 26 and loads 30.

As previously mentioned, the power system 10 includes IEDs adapted to protect, monitor, control, meter and/or automate power system elements of the power system 10. Some IEDs require communication with another IED in order to perform their function. For example, two IEDs 100 and 102, configured as distance relays to protect a segment of a sub-transmission line 21, typically communicate information to each other regarding the existence of a fault between the circuit breakers associated with the IEDs, or elsewhere on the power system 10. Accordingly, communication between the two IEDs 100 and 102 is important in order to distinguish between, and clear, both internal faults (between the two circuit breakers associated with IEDs) as well as nearby external faults (e.g., to the right of IED 102). A third IED 104, also configured as a distance relay, may also be included to communicate with both the IED 100 and the IED 102 to provide protection for other transmission line segments of the power system 10. Although not separately illustrated, the power system 10 may also include a networked communication system.

Figure 2:
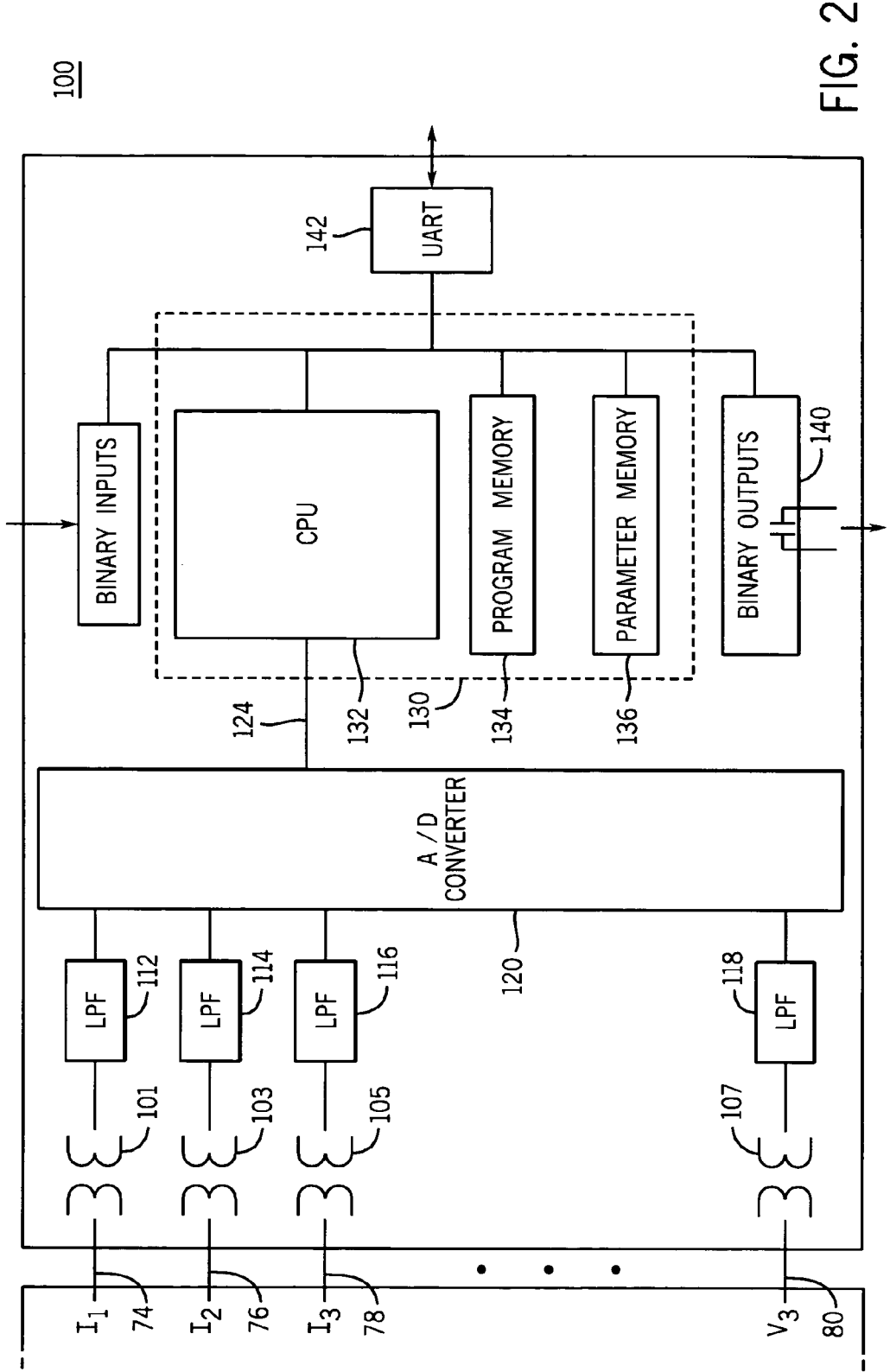
FIG. 2 is a block diagram of an exemplary IED of FIG. 1 configured as a distance relay, according to an embodiment of the invention.

For example, FIG. 2 is a block diagram of an exemplary configuration of the IED 100 configured as a distance relay where the secondary current waveforms 74, 76, 78 are illustrated as $I_1$, $I_2$, $I_3$ and one of the secondary voltages is illustrated as to $V_3$ ($V_1$, $V_2$ not separately illustrated). Although only three secondary currents and one secondary voltage are shown, it should be understood that there may be more or less secondary currents and secondary voltages monitored by the IED 100. In the illustrated example, IEDs 102 and 104 are substantially similarly configured and operable. During operation, the secondary current waveforms and voltages 74, 76, 78 to 80 received by the IED 100 are further transformed into corresponding voltage waveforms via respective current transformers 101, 103, 105, to 107 and resistors (not separately illustrated), and filtered via respective analog low pass filters 112, 114, 116 to 118. An analog-to-digital (A/D) converter 120 then multiplexes, samples and digitizes the filtered secondary current waveforms to form corresponding digitized current sample streams (e.g., 1011001010001111).

The corresponding digitized current sample streams are received by a microcontroller 130, where they are digitally filtered via, for example, a Cosine filter to eliminate DC and unwanted harmonic frequency components. In an embodiment, the microcontroller 130 includes a microprocessor, or CPU 132, a program memory 134 (e.g., a Flash EPROM) and a parameter memory 136 (e.g., an EEPROM). As will be appreciated by those skilled in the art, other suitable microcontroller configurations (or FPGA configurations) may be utilized.

The microprocessor 132 executing a computer program, protection algorithm or relay logic scheme processes each of the digitized current sample streams to extract phasors representative of their corresponding primary current and voltage waveforms, and then performs various calculations using the phasors to determine whether a fault (e.g., a short circuit) exists. If a fault is detected, the microcontroller 130 will subsequently cause binary output contacts 140 to be closed (via output status bits having a logic high binary value) thereby opening an associated power circuit breaker (e.g., the circuit breaker 18) to isolate the portion of the sub-transmission line 21 experiencing the fault from the remainder of the power system 10.

In addition to determining whether a fault exists, the microcontroller 130 is also adapted to enable direct bidirectional serial transmission of output status bits, digitized analog values and digitized virtual terminal data to, for example, the second IED 102 or the third IED 104 via a UART 142 (or equivalent) and a corresponding serial communication links 34 and 38 (see, FIG. 1) as described above in connection with U.S. patent application Ser. No. 09/900,098. In other words, each of the IEDs 100, 102, 104 includes mirrored bit communication capability. It should be noted that the term "serial communication link" used herein refers to a serial communication link having mirrored bits transmission capability.

As noted above, the Mirrored Bits® Interface device enables both receive and transmit mirrored bit communication testing of an IED and/or its associated serial communication link. Drawbacks to using the Mirrored Bits® Interface device include the physical size of the Mirrored Bits® Interface device and the need to hand-enter the Baud rate, RX ID and TX ID of the coupled IED.

Figure 3:
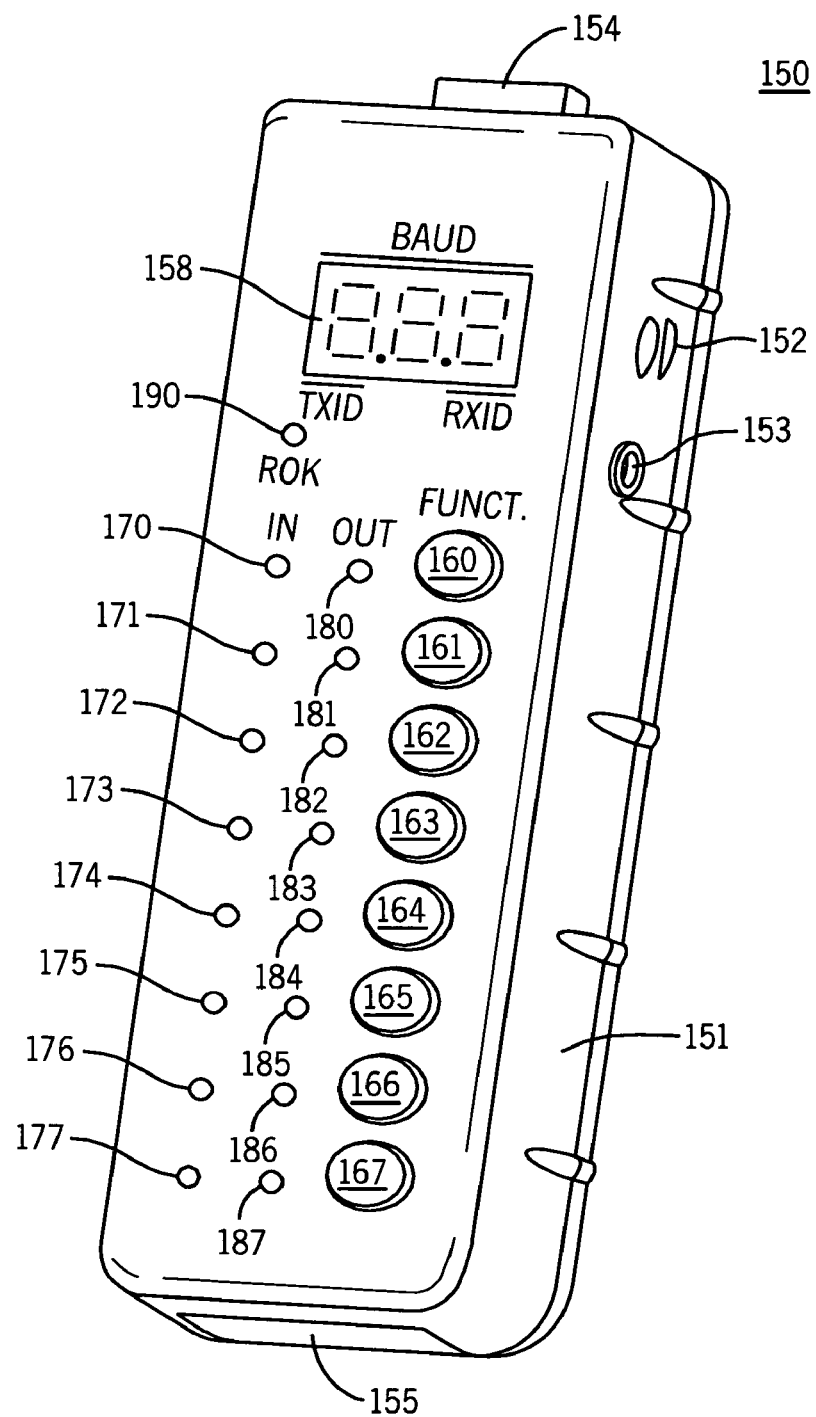
FIG. 3 is a perspective view of a handheld communication tester for testing direct serial communication capability of the IED of FIG. 2, according to an embodiment of the invention.

FIG. 3 is a perspective view of a handheld communication tester 150 for testing direct serial communication capability of the IED 100, according to an embodiment of the invention. As noted above, the IED 100 is configured for direct bi-directional serial mirrored bits communication of output status bits, digitized analog values and digitized virtual terminal data. During testing, the handheld communication tester 150 may be connected to the IED 100 in one of two ways. The handheld communication tester 150 can replace one of the two IEDs such that the handheld communication tester 150 is connected via its DB9 connector (discussed below) to the serial communication link operatively coupling the two IEDs. Alternatively, the handheld communication tester 150 can be connected directly to the IED 100 via its DB9 connector.

The handheld communication tester 150 is adapted to enable both the receive and the transmit mirrored bit communication function of the IED 100. Like the Mirrored Bits® Interface device, the handheld communication tester 150 requires knowledge of the Baud rate, and the receive identification number (RX ID) and/or the transmit identification number (TX ID). The Baud rate is the rate at which bits are delivered over the serial communication link 34. The RX ID and TX ID are a pair of unique numbers (e.g., 3 and 4) assigned to each IED to prevent communication problems when the IED is in a loop-back test mode. The RX ID and TX ID also enable detection of a misrouted communication link by the communication network. The TX ID is used to encode outgoing, or transmitted, messages from the IED 100 during normal operation. Each IED decodes its incoming, or received messages using its RX ID. If the message decoded by the receiving IED includes the same RX ID as the TX ID of the IED which encoded and transmitted the message, then the decoding will be successful. Otherwise, the decoding process will fail, indicating that the RX ID does not match the TX ID, and the receiving IED disregards the received message. Additional settings may be used for testing with the handheld communication tester 150, but the Baud rate and at least one identification parameter (e.g., RX ID and/or TX ID) are required in order to test the mirrored bit communication capability of the IED 100.

Unlike the Mirrored Bits® Interface device however, the Baud rate, RX ID and TX ID do not have to be hand-entered into the handheld communication tester 150; rather, the handheld communication tester 150 derives/detects the Baud rate, RX ID and TX ID of the coupled IED prior to operation. In addition, unlike the Mirrored Bits® Interface device, the handheld communication tester 150 is small and easily transported.

Referring to FIG. 3, the handheld communication tester 150 includes a housing 151 suitably sized for convenient single-hand portability (e.g., 5 in.×2 in.×1 in). Disposed in the housing 151 and easily accessible by a user is an ON/OFF switch 152 to enable operation of the handheld communication tester 150, a power jack 153 adapted to enable power to be provided to the handheld communication tester 150, a subminiature 9-pin D (DB9) connector 154 adapted to enable connection of the handheld communication tester 150 to the mirrored bits communication link 34 or to the IED 100, a memory card slot 155 adapted to receive a memory card (e.g., a smart card) storing, for example, operating instructions or test results, and a three character 7-segment liquid crystal display (LCD) 158 adapted to display the Baud rate, the TX ID and the RX ID in a periodic fashion.

The handheld communication tester 150 also includes a number of pushbuttons, a corresponding set of IN LEDs and a corresponding set of OUT LEDs. A Receive OK LED 190 is also included. The number of pushbuttons may vary depending on the number of channels or bits per the mirrored bit communication link. In the illustrated embodiment where eight channels are included in the mirrored bits communication link 34, the handheld communication tester 150 includes eight pushbuttons 160-167, a set of eight IN LEDs 170-177 and a set of eight OUT LEDs 180-187.

A power supply 156 such as two AAA alkaline cells, enclosed inside of the housing 151, provides power for the handheld communication tester 150. Alternatively, power may be supplied via a pin of the DB9 connector 154, or the power jack 153. Also disposed inside the housing 152 is a microcontroller 157 operatively coupled to a universal asynchronous receiver/transmitter (UART) 159 (see, FIG. 4). The UART 159 may also be integral to the microcontroller 157. The UART 159 is configured to convert bytes resulting from the handheld communication tester 150 operation (as a transmitter) into a single serial bit stream for outbound transmission via the mirrored bits communication link 34 to the IED 100, and to convert an inbound serial bit stream (from the IED 100) into bytes suitable for use by the microcontroller 157 of the handheld communication tester 150. It should be noted that the UART or UART function may be replaced one of another suitable transmitter/receiver component or function.

Figure 4:
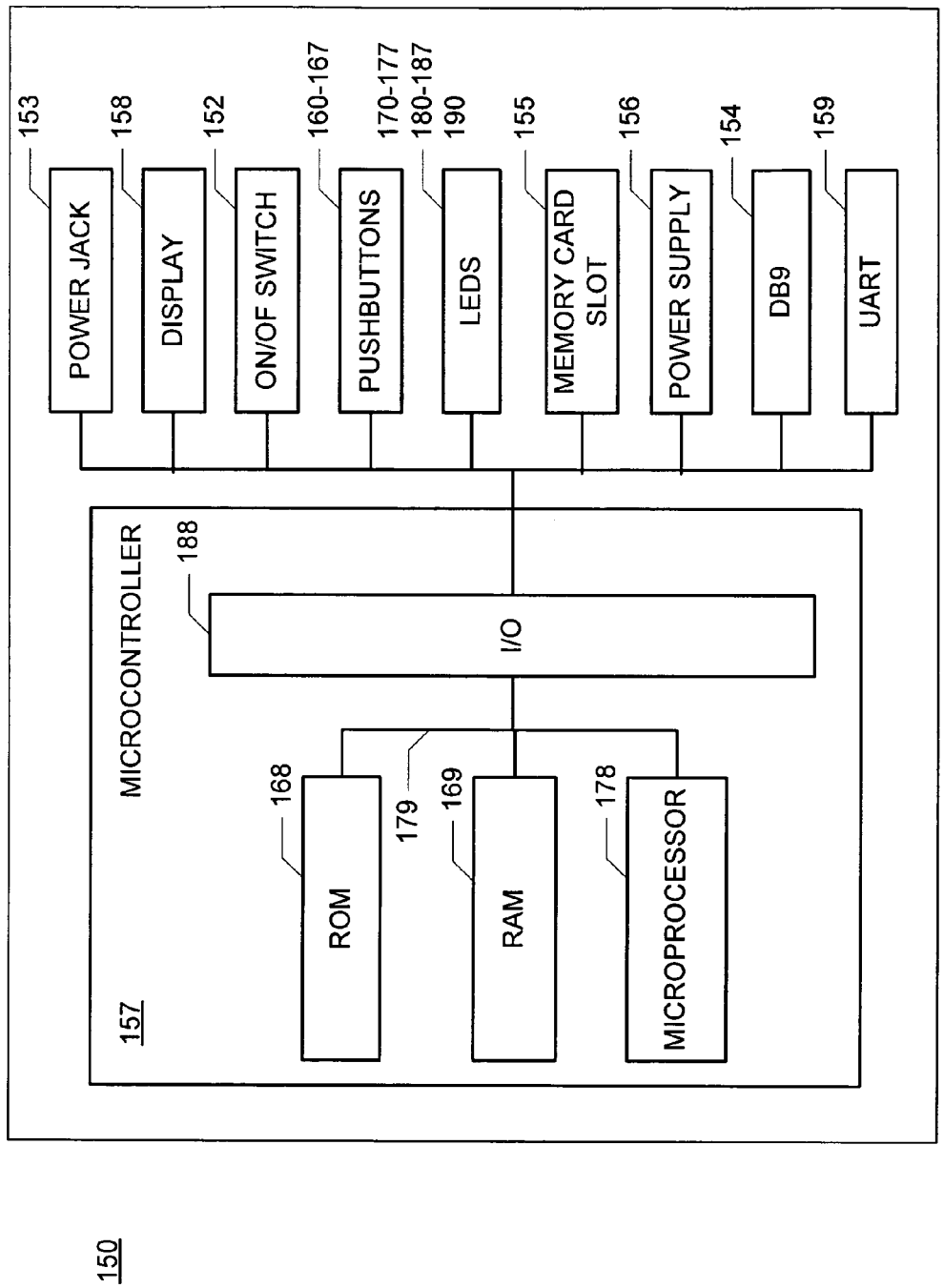
FIG. 4 is a block diagram of the handheld communication tester of FIG. 3 including a microcontroller, according to an embodiment of the invention.

FIG. 4 is a block diagram illustrating the electronic components of the handheld communication tester 150 including the microcontroller 157, according to an embodiment of the invention. Referring to FIG. 4, the microcontroller 157 includes a microcontroller-based platform or microprocessor 178, a read only memory (ROM) 168, a random access memory (RAM) 169, all of which may be interconnected to an input/output (I/O) circuit 188 via a communications link or an address bus 179 or other suitable means. Any or all of those elements may also be integral to the microcontroller 157.

Among other things, the microprocessor 178 is capable of detecting/deriving and causing the Baud rate, the TX ID value and the RX ID value to be displayed on the LCD 158 during execution of the method for testing mirrored bit communication capability of an IED (described below). The RAM 169 is capable of storing data used or generated during execution of the method for testing mirrored bit communication capability of the IED. The RAM 169 may be implemented as a semiconductor memory, a magnetically readable memory, an optically readable memory, etc. Among other things, the ROM 168 is capable of storing program code that controls operation of the handheld communication tester 150 during execution of the method for testing mirrored bit communication capability of the IED. Although not separately illustrated, the microcontroller 157 may additionally include electrically erasable programmable read-only memory (EEPROM).

In addition to the UART 159, the microcontroller 157 is operatively coupled, via the I/O circuit 188 to the power jack 153, the display 158, the ON/OFF switch 152, the pushbuttons 160-167, the LEDs 170-177, 180-187 and 190, the memory card slot 155, the power supply 156, and the DB9connector 154. Although not separately illustrated, it is contemplated that other peripheral elements or devices (e.g., an input device, a microprocessor based device) may be operatively coupled to the microcontroller 157 to, for example, configure operation of the handheld communication tester 150.

It should be appreciated that although the microcontroller 157 is a preferable implementation of the invention, it is contemplated that the handheld communication tester 150 may also be configured with a field programmable gate array (FPGA), one or more application specific integrated circuits (ASICs), adaptable computing integrated circuits, or any other suitable central processing unit.

One manner in which the handheld communication tester 150 may operate is described below in connection with one or more flowcharts that represent a number of portions or routines of one or more computer programs, which may be stored in one or more of the memories of the handheld communication tester 150, or may be stored remotely and downloaded to the handheld communication tester 150.

Figure 5:
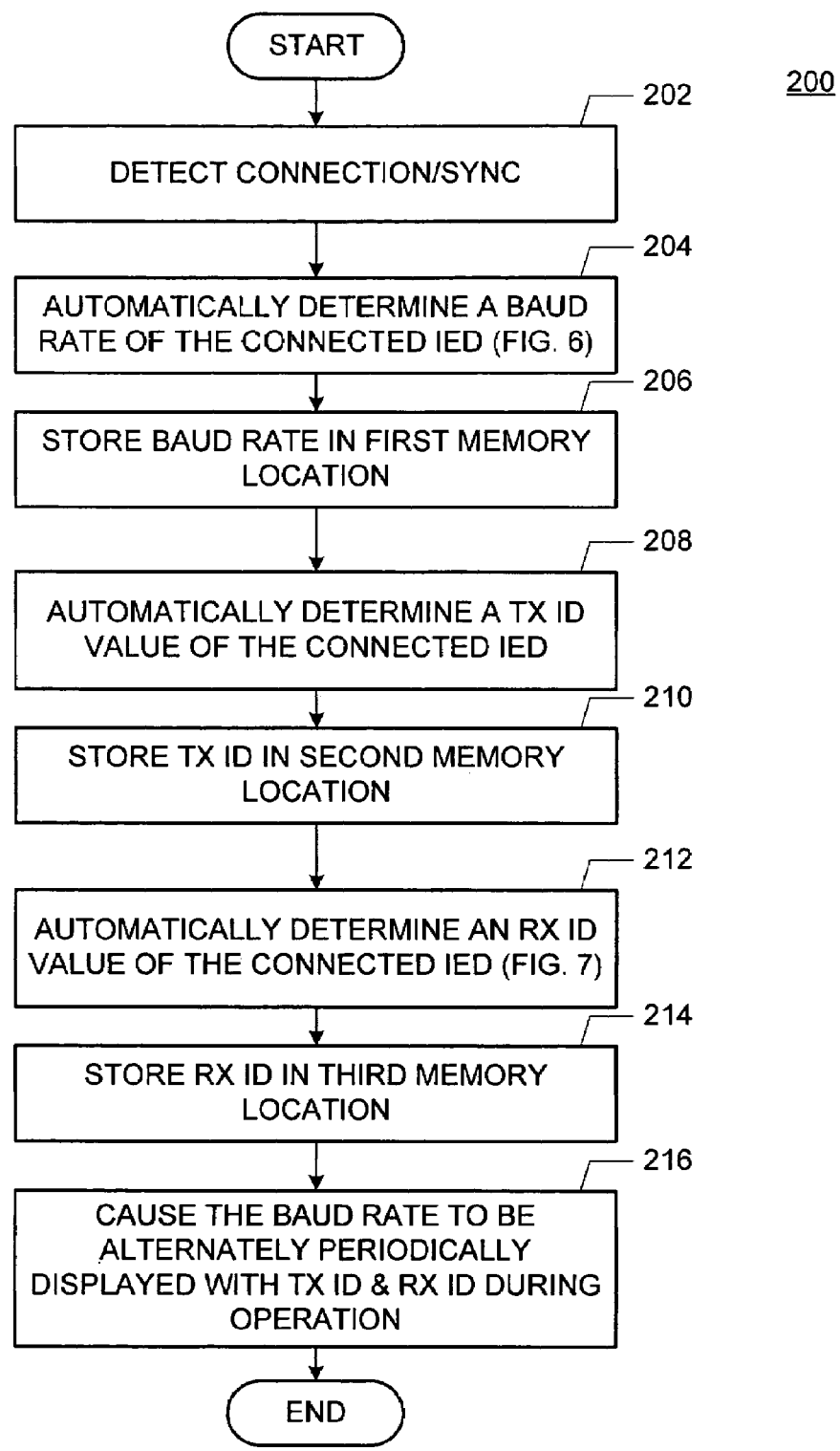
FIGS. 5-7 are a number of flowcharts of a method for testing direct serial communication capability of the IED of FIG. 2 using the handheld communication tester of FIG. 3, according to an embodiment of the invention.
Figure 6:
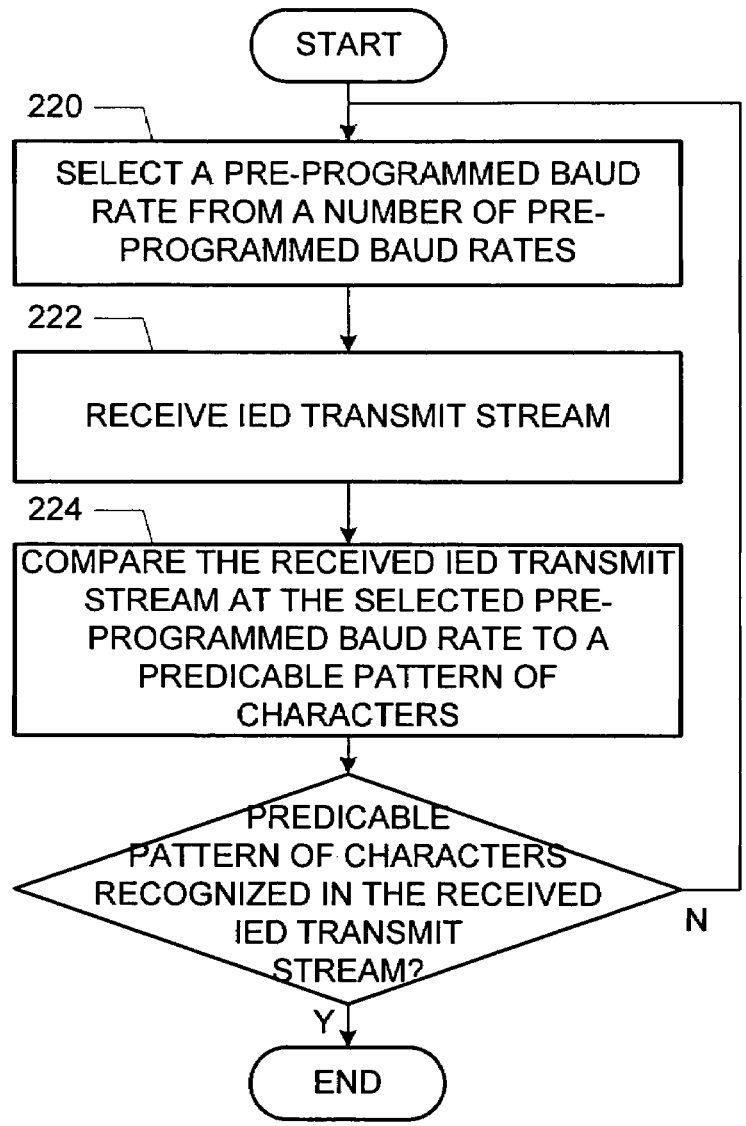
Figure 7:
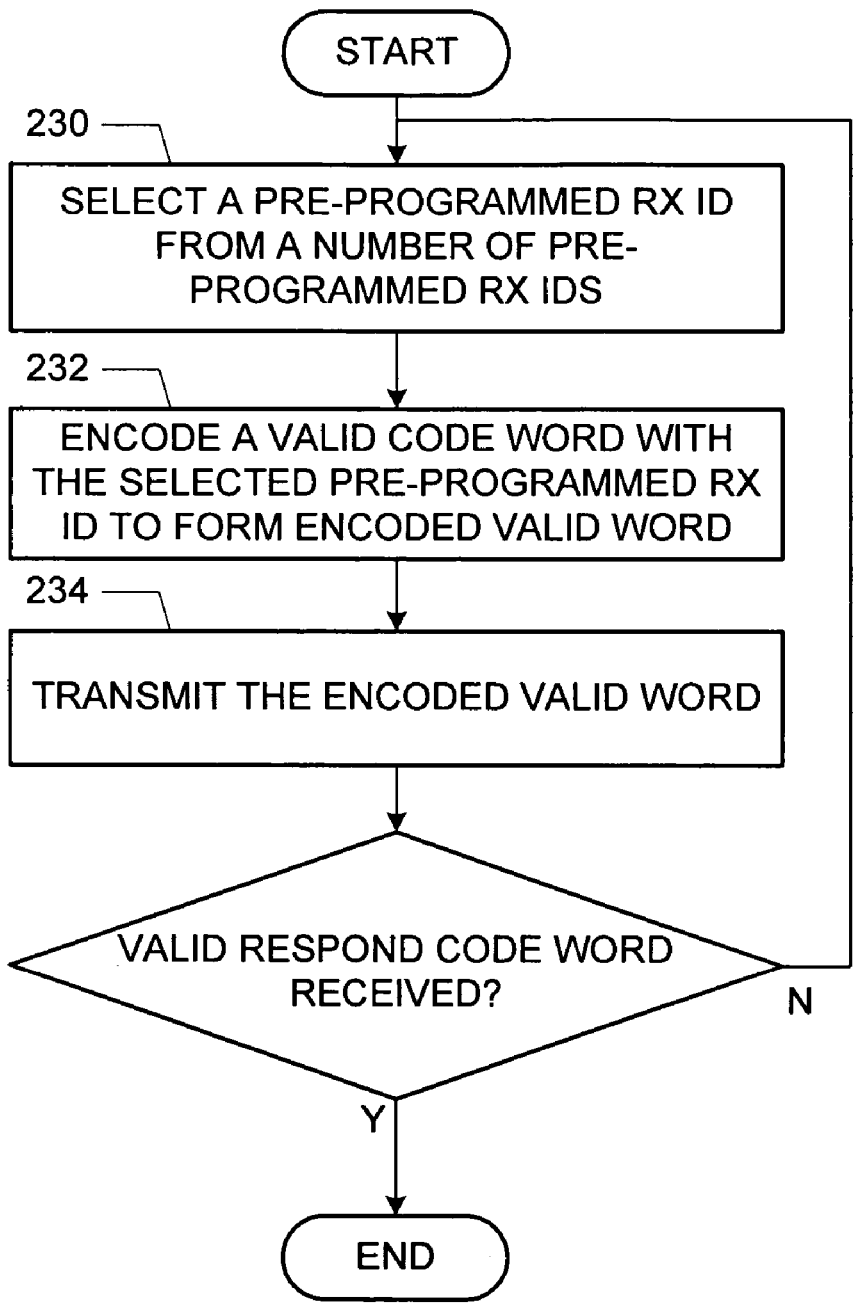

FIGS. 5-7 are a number of flowcharts of a method 200 for testing direct serial communication capability of the IED 100 using the handheld communication tester 150, according to an embodiment of the invention. For ease of discussion, the handheld communication tester 150 is connected to the serial communication link 34 associated with the IED 100. As noted above however, the handheld communication tester 150 may also be connected to any one of the IEDs of the power system 10 or to any one of the serial communication links 34, 36, 38.

Referring to FIG. 5, upon detecting a connection to the IED 100 via the DB9 connector 154, (step 202), the microcontroller 157 automatically determines the Baud rate of the IED 100 based on a mirrored bits transmission protocol utilized by the IED 100 and a number of pre-programmed Baud rates (e.g., 2400 bps, 4800 bps, 9600 bps, 19.2 kbps, 38.4 Kbps) of the handheld communication tester 150 (step 204). The mirrored bits protocol includes transmission of a pre-determined and predicable pattern of characters in the IED transmit stream from the IED 100 during the time the IED 100 is not receiving mirrored bits transmissions.

To determine the Baud rate (see, FIG. 6), the microcontroller 157 selects a first pre-programmed Baud rate (220), receives the IED transmit stream (step 222) and then compares the received IED transmit stream at the first pre-programmed Baud rate to the predicable pattern of characters (224). If the predicable pattern of characters is recognized in the IED transmit stream by the microcontroller 157, the microcontroller 157 determines that the first pre-programmed Baud rate is the Baud rate of the IED 100. If the predicable pattern of characters is not recognized in the IED transmit stream by the microcontroller 157, the microcontroller 157 selects a second pre-programmed Baud rate from the number of pre-programmed Baud rates, and compares the received IED transmit stream, at the second pre-programmed Baud rate, to the predicable pattern of characters. The process of selecting a pre-programmed Baud rate and comparing the received IED transmit stream to the predicable pattern of characters continues until the microcontroller 157 recognizes the predicable pattern of characters in the received IED transmit stream. The pre-programmed Baud rate at which the predicable pattern of characters is identified in the received IED transmit stream is determined to be the Baud rate of the IED 100, and is stored in a first memory location of the microcontroller 157 (step 206).

Upon determining the proper Baud rate of the IED 100, the microcontroller 157 automatically determines the TX ID of the IED 100 (step 208) and stores it in a second memory location of the microcontroller 157 (step 210). The TX ID is included in the predicable pattern of characters of the received IED transmit stream.

In addition, the microcontroller 157 automatically determines the RX ID of the IED 100 (step 212). The RX ID however, is not included in the predicable pattern of characters of the IED transmit stream. Instead, the microcontroller 157 utilizes a number of pre-programmed RX IDs to determine the RX ID of the IED 100. In the illustrated example, the RX ID of the IED 100 is one of four RX IDs programmed in the handheld communication tester 150. It is contemplated that one of any number of RX IDs may be used to identify the IEDs of the power system 100 and may therefore be pre-programmed into the handheld communication tester 150.

In order to determine the correct RX ID (see, FIG. 7), the microcontroller 157 selects a first pre-programmed RX ID (step 230), encodes a valid code word, such as an "all zero code word", with the first pre-programmed RX ID to form a first encoded valid word (step 232) and transmits the first encoded valid word to the IED 100 (step 234). If the first encoded valid word received by the IED 100 includes the correct RX ID, the IED 100 responds with a valid respond code word. If the valid respond code word is received by the handheld communication tester 150, the microcontroller 157 determines that the first pre-programmed RX ID is the RX ID of the IED 100. On the other hand, if the first encoded valid word received by the IED 100 does not include the correct RX ID, the IED 100 continues to transmit, and the handheld communication tester 150 continues to receive, the predicable pattern of characters. In response, the handheld communication tester 150 selects a second pre-programmed RX ID encodes the valid code word with the second pre-programmed RX ID to form a second encoded valid word and transmits the second encoded valid word to the IED 100. The process of selecting a pre-programmed RX ID, encoding the valid code word with the selected pre-programmed RX ID and transmitting the encoded pre-programmed RX ID to the IED 100 continues until a valid response code word is received by the handheld communication tester 100. When the valid respond code word is received by the handheld communication tester 150, the microcontroller 157 determines that the pre-programmed RX ID that resulted in receipt of the valid respond code word from the IED 100 is the RX ID of the IED 100, and stores it in a third memory location of the microcontroller 157 (step 214). The handheld communication tester 150 is synchronized with the IED 100 and ready for use, as signaled by the ROK LED 190.

During operation of the handheld communication tester 150, each of the Baud rate, the TX ID and the RX ID are periodically displayed on the three digit, seven segment LCD display 158. The microcontroller 157 causes the display 158 to alternate between displaying one of two modes every few seconds. In the first mode, the TX ID value is displayed as the left-most digit, the RX ID value is displayed as the right-most digit, and the center digit is blank. In the second mode, all three digits are used to display the Baud rate. For example, if the Baud rate is 19,200 bps, the handheld communication tester 150 displays 19.2.

To test the receive function of the IED 100, an operator actuates one or more of the pushbuttons of the handheld communication tester 150, thereby asserting one or more transmitted mirrored bits (TMBs). For example, depressing the first pushbutton 160 changes the state of the first TMB from a binary low value to a binary high value, and depressing the first pushbutton again changes the state of the first TMB from the binary high value (e.g., 1) to the binary low value (e.g., 0). Each of the second set of OUT LEDs 180-187, either extinguished or illuminated, displays the status of a corresponding TMB.

To test the transmit function of the IED 100, each of the set of IN LEDs 170-177 displays the status of its corresponding received mirrored bit (RMB) from the IED 100. For example, an extinguished first IN LED 170 of the set of IN LEDs indicates that RMB 1 has a binary low value, while an illuminated first IN LED 170 indicates that RMB 1 has a binary high value. Accordingly, the handheld communication tester 150 allows the operator to control/select/monitor outgoing TMBs and to monitor/display incoming RMBs, thereby testing mirrored bit communication capability of the serial communication link and/or the IED.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. A handheld communication tester for testing direct serial communication capability of a first intelligent electronic device (IED) in a power system, the first IED including a plurality of transmit bit channels and a plurality of receive bit channels, the handheld communication tester comprising:
   a housing including a connector adapted for connection to the first IED; and
   a microcontroller disposed inside of the housing and operatively coupled to the connector and a power source, the microcontroller including a microprocessor and a memory operatively coupled to the microprocessor, the microcontroller being programmed to:
   detect connection with the first IED,
   automatically detect and store a Baud rate of the first IED, and
   automatically detect and store at least one identification of the first IED, wherein the identification comprises a receive identification of the first IED used to decode transmissions received by the first IED.

2. The handheld communication tester of claim 1, wherein the at least one identification of the first IED comprises a transmit identification of the first IED.

3. The handheld communication tester of claim 2, wherein the transmit identification of the first IED is used to encode transmissions from the first IED.

4. The handheld communication tester of claim 1, wherein the microcontroller is further programmed to cause a visual indication upon detecting synchronization with the first IED.

5. The handheld communication tester of claim 1, wherein the first IED is configured for mirrored bits communication, and wherein the serial communication link is adapted to enable bi-directional mirrored bits communication with a second IED, mirrored bits communication enabling output status bits, digitized analog values and virtual terminal data allocated to the plurality of transmit bit channels to be serially transmitted from the first IED to the second IED for use by the second IED.

6. The handheld communication tester of claim 1, further comprising:
   a first plurality of light emitting diodes, one of each of the first plurality of light emitting diodes corresponding to one of each of the plurality of receive bit channels;
   a second plurality of light emitting diodes, one of each of the second plurality of light emitting diodes corresponding to one of each of the plurality of transmit bit channels; and
   a liquid crystal display,
   each of the first plurality of light emitting diodes, the second plurality of light emitting diodes and the liquid crystal display operatively coupled to the microcontroller and disposed on the housing for easy viewing.

7. The handheld communication tester of claim 6, further comprising:
   a number of pushbuttons, each of the number of pushbuttons corresponding to one of each of the second plurality of light emitting diodes;
   a memory card slot; and
   an ON/OFF switch,
   each of the number of pushbuttons, the memory card slot and the ON/OFF switch operatively coupled to the microcontroller and disposed on the housing for easy access by an operator.

8. The handheld communication tester of claim 7, wherein the microcontroller is further programmed to illuminate selected light emitting diodes of the second plurality of light emitting diodes in response to actuation of corresponding pushbuttons of the number of pushbuttons, an illuminated light emitting diode of the second plurality of light emitting diodes indicating a binary high value for a bit of a corresponding transmit bit channel.

9. The handheld communication tester of claim 7, wherein the microcontroller is further programmed to illuminate selected light emitting diodes of the first plurality of light emitting diodes, an illuminated light emitting diode of the first plurality of light emitting diodes indicating a binary high value for a bit of a corresponding receive bit channel.

10. The handheld communication tester of claim 1, wherein the microcontroller is further programmed to:
   (a) select a pre-programmed Baud rate from a number of pre-programmed Baud rates;
   (b) receive an IED transmit stream from the first IED;
   (c) compare the received IED transmit stream at the selected pre-programmed Baud rate to a predictable pattern of characters;

(d) store the pre-programmed Baud rate in a first memory location as the Baud rate if the predictable pattern of characters is recognized in the received IED transmit stream at the selected pre-programmed Baud rate; and (e) repeat steps (a)-(c) if the predictable pattern of characters is not recognized in the received IED transmit stream at the selected pre-programmed Baud rate.

11. The handheld communication tester of claim 10, wherein the microcontroller is further programmed to:
detect the transmit identification of the first IED in the predictable pattern of characters recognized in the received IED transmit stream; and
store the transmit identification in a second memory location.

12. The handheld communication tester of claim 1, wherein the microcontroller is further programmed to:
(a) select a pre-programmed receive identification from a number of pre-programmed receive identifications;
(b) encode a valid code word with the pre-programmed receive identification to form an encoded valid word;
(c) transmit the encoded valid word to the first IED;
(d) store the pre-programmed receive identification in a third memory location as the receive identification if a valid respond code word is received from the first IED; and
(e) repeat steps (a)-(c) if the valid respond code word is not received from the first IED.

13. The handheld communication tester of claim 1, wherein the connector comprises a subminiature 9-pin connector.

14. A handheld communication tester for testing direct serial communication capability of a first intelligent electronic device (IED) in a power system, the first IED including a plurality of transmit bit channels and a plurality of receive bit channels, the handheld communication tester comprising:
a housing sized for single-hand portability;
a connector disposed in a wall of the housing, the connector adapted for connection to the first IED or to a serial communication link to the first IED; and
a microcontroller disposed inside of the housing and operatively coupled to the connector and a power source, the microcontroller including a microprocessor and a memory operatively coupled to the microprocessor, the microcontroller being programmed to:
detect operative connection with the first IED,
automatically detect and store a Baud rate of the first IED,
automatically detect and store a transmit identification of the first IED, the transmit identification used to encode transmissions from the first IED, and
automatically detect and store a receive identification of the first IED, the receive identification used to decode transmissions received by the first IED.

15. The handheld communication tester of claim 14, wherein the microcontroller is further programmed to cause a visual indication upon detecting synchronization with the first IED.

16. The handheld communication tester of claim 14, wherein the first IED is configured for mirrored bits communication, and wherein the serial communication link is adapted to enable bidirectional mirrored bits communication with a second IED, mirrored bits communication enabling output status bits, digitized analog values and virtual terminal data allocated to the plurality of transmit bit channels to be serially transmitted from the first IED to the second IED for use by the second IED.

17. The handheld communication tester of claim 14, further comprising:
a first plurality of light emitting diodes, one of each of the first plurality of light emitting diodes corresponding to one of each of the plurality of receive bit channels;
a second plurality of light emitting diodes, one of each of the second plurality of light emitting diodes corresponding to one of each of the plurality of transmit bit channels; and
a liquid crystal display,
each of the first plurality of light emitting diodes, the second plurality of light emitting diodes and the liquid crystal display operatively coupled to the microcontroller and disposed on the housing for easy viewing.

18. The handheld communication tester of claim 17, further comprising:
a number of pushbuttons, each of the number of pushbuttons corresponding to one of each of the second plurality of light emitting diodes;
a memory card slot; and
an ON/OFF switch,
each of the number of pushbuttons, the memory card slot and the ON/OFF switch operatively coupled to the microcontroller and disposed on the housing for easy access by an operator.

19. The handheld communication tester of claim 18, wherein the microcontroller is further programmed to illuminate selected light emitting diodes of the second plurality of light emitting diodes in response to actuation of corresponding pushbuttons of the number of pushbuttons, an illuminated light emitting diode of the second plurality of light emitting diodes indicating a binary high value for a bit of a corresponding transmit bit channel.

20. The handheld communication tester of claim 18, wherein the microcontroller is further programmed to illuminate selected light emitting diodes of the first plurality of light emitting diodes, an illuminated light emitting diode of the first plurality of light emitting diodes indicating a binary high value for a bit of a corresponding receive bit channel.

21. The handheld communication tester of claim 14, wherein the microcontroller is further programmed to:
(a) select a pre-programmed Baud rate from a number of pre-programmed Baud rates;
(b) receive an IED transmit stream from the first IED;
(c) compare the received IED transmit stream at the selected pre-programmed Baud rate to a predictable pattern of characters;
(d) store the pre-programmed Baud rate in a first memory location as the Baud rate if the predictable pattern of characters is recognized in the received IED transmit stream at the selected pre-programmed Baud rate; and
(e) repeat steps (a)-(c) if the predictable pattern of characters is not recognized in the received IED transmit stream at the selected pre-programmed Baud rate.

22. The handheld communication tester of claim 21, wherein the microcontroller is further programmed to:
detect the transmit identification of the first IED in the predictable pattern of characters recognized in the received IED transmit stream; and
store the transmit identification in a second memory location.

23. The handheld communication tester of claim 14, wherein the microcontroller is further programmed to:
(a) select a pre-programmed receive identification from a number of pre-programmed receive identifications;
(b) encode a valid code word with the pre-programmed receive identification to form an encoded valid word;

(c) transmit the encoded valid word to the first IED;

(d) store the pre-programmed receive identification in a third memory location as the receive identification if a valid respond code word is received from the first IED; and (e) repeat steps (a)-(c) if the valid respond code word is not received from the first IED.

24. The handheld communication tester of claim 14, wherein the connector comprises a subminiature 9-pin connector.

25. A method for testing direct serial communication capability of a first intelligent electronic device (IED) in a power system, the first IED including a plurality of transmit bit channels and a plurality of receive bit channels, the method comprising:

providing a handheld communication tester having a housing, a connector adapted for connection to the first IED, and a microcontroller disposed inside of the housing and operatively coupled to the connector and a power source, the handheld communication tester sized for single-hand portability;

detecting connection with the first IED;

automatically detecting and storing a Baud rate of the first IED; and automatically detecting and storing at least one identification of the first IED, wherein the identification comprises a receive identification of the first IED used to decode transmissions received by the first IED.

26. The method of claim 25, wherein the at least one identification of the first IED is selected from the group consisting of a transmit identification of the first IED.

27. The method of claim 26, wherein the transmit identification of the first IED is used to encode transmissions from the first IED.

28. The method of claim 25, further comprising causing a visual indication upon detecting synchronization with the first IED.

29. The method of claim 25, wherein the first IED is configured for mirrored bits communication, and wherein the serial communication link is adapted to enable bidirectional mirrored bits communication with a second IED, mirrored bits communication enabling output status bits, digitized analog values and virtual terminal data allocated to the plurality of transmit bit channels to be serially transmitted from the first IED to the second IED for use by the second IED.

30. The method of claim 25, wherein the handheld communication tester further includes a first plurality of light emitting diodes, a second plurality of light emitting diodes, a number of pushbuttons, the first and second plurality of light emitting diodes corresponding to the plurality of receive and transmit bit channels, respectively, the method further comprising:

illuminating selected light emitting diodes of the second plurality of light emitting diodes in response to actuation of corresponding pushbuttons of the number of pushbuttons, an illuminated light emitting diode of the second plurality of light emitting diodes indicating a binary high value for a bit of a corresponding transmit bit channel; and illuminating selected light emitting diodes of the first plurality of light emitting diodes, an illuminated light emitting diode of the first plurality of light emitting diodes indicating a binary high value for a bit of a corresponding receive bit channel.

31. The method of claim 25, further comprising:

(a) selecting a pre-programmed Baud rate from a number of pre-programmed Baud rates;

(b) receiving an IED transmit stream from the first IED;

(c) comparing the received IED transmit stream at the selected pre-programmed Baud rate to a predictable pattern of characters;

(d) storing the pre-programmed Baud rate in a first memory location as the Baud rate if the predictable pattern of characters is recognized in the received IED transmit stream at the selected pre-programmed Baud rate; and (e) repeating steps (a)-(c) if the predictable pattern of characters is not recognized in the received IED transmit stream at the selected pre-programmed Baud rate.

32. The method of claim 31, further comprising:

detecting the transmit identification rate of the first IED in the predictable pattern of characters recognized in the received IED transmit stream; and storing the transmit identification rate in a second memory location.

33. The method of claim 25, further comprising:

(a) selecting a pre-programmed receive identification from a number of pre-programmed receive identifications;

(b) encoding a valid code word with the pre-programmed receive identification to form an encoded valid word;

(c) transmitting the encoded valid word to the first IED;

(d) storing the pre-programmed receive identification in a third memory location as the receive identification if a valid respond code word is received from the first IED; and (e) repeating steps (a)-(c) if the valid respond code word is not received from the first IED.

34. The method of claim 25, wherein the handheld communication tester further includes a display, the method further comprising alternating between displaying the Baud rate and displaying the transmit identification with the receive identification.

* * * * *